United States Patent [19]

Tadokoro et al.

[11] Patent Number: 4,862,442
[45] Date of Patent: Aug. 29, 1989

[54] FOCUS DETECTING APPARATUS UTILIZING REFLECTING SURFACE HAVING VARIABLE REFLECTIVITY OR TRANSMISSIVITY

[75] Inventors: Michihiro Tadokoro; Kazuo Okada; Hitoshi Imai, all of Amagasaki, Japan

[73] Assignee: Mitsubishi Denki Kabushiki Kaisha, Tokyo, Japan

[21] Appl. No.: 182,248

[22] Filed: Apr. 15, 1988

[30] Foreign Application Priority Data

Apr. 20, 1987 [JP] Japan ................... 62-96665

[51] Int. Cl.$^4$ ............................................. G11B 7/00
[52] U.S. Cl. ...................................... 369/45; 250/201
[58] Field of Search ............. 250/201 DF; 369/43–47; 358/342

[56] References Cited

U.S. PATENT DOCUMENTS 4,363,961 12/1982 Okada et al. .................... 250/201
4,636,627 1/1987 Matsumura ..................... 250/201

FOREIGN PATENT DOCUMENTS 83848 7/1979 Japan .
83849 7/1979 Japan .
97055 7/1979 Japan .
103306 8/1979 Japan .
7246 1/1981 Japan .

Primary Examiner—Robert L. Richardson
Attorney, Agent, or Firm—Fleit, Jacobson, Cohn, Price, Holman & Stern

[57] ABSTRACT

A light beam emitted from a source is focused on an object. The beam reflected by the object passes through an optical member and is detected by a photodetector. The optical member has a reflecting surface the reflectivity of which varies continuously with respect to the angle of incidence.

6 Claims, 8 Drawing Sheets

FOCUS DETECTING APPARATUS UTILIZING REFLECTING SURFACE HAVING VARIABLE REFLECTIVITY OR TRANSMISSIVITY

BACKGROUND OF THE INVENTION

This invention relates to a focus detecting apparatus used in an optical recording and playback system wherein a light is focused and a spot of light is made through an objective lens onto an information-carrying medium to read or write information, the function of the focus detecting apparatus being to detect when the light is not correctly focused on the information-carrying medium.

Optical playback and recording systems have become familiar devices, employing such information-carrying media as compact discs, video discs and optical memory discs. Consider, for example, a video disc system. The information is reproduced from a disc that rotates at high speed while a beam from a laser light source such as a semiconductor laser is focused through an objective lens onto an information track by detecting the modulated light transmitted through or reflected from the information track. A feature of this type of information-carrying medium is the extremely high density of the recorded information: the information tracks are very narrow, and the pitches between adjacent information tracks are very small. If information is to be read accurately from such narrow, closely-spaced information tracks, the objective lens must maintain correct focus on the video disc surface and create a small-diameter light spot having high resolution with respect to the information on the disc surface. To maintain the correct focus, optical playback and recording systems of the this type must detect the departure from focus of the disc surface and correct the focus by moving the objective lens parallel to its optic axis in response to a focusing error signal from a photodetector.

FIG. 6 is a ray-tracing diagram showing the configuration of the principal parts of the focus detecting apparatus of an optical playback and recording system described in Japanese Patent Application Laid-open No. 7246/1981. The beam from a laser light source 1 (which is linearly polarized in the plane of the page) is collimated by a collimator lens 2. Also shown in the drawing are a polarization beam splitter 3, a quarter-wave plate 4, an objective lens 5, an information-carrying medium 6 with information tracks, a detector prism 7 having a reflecting surface 8, and a photodetector 9 comprising two sections 9A and 9B.

This apparatus operates as follows. The beam (which is linearly polarized parallel to the plane of the page) from the laser light source 1 is collimated by the collimator lens 2, transmitted through the polarization beam splitter 3 and the quarter-wave plate 4, and converged by the objective lens 5 onto the information-carrying medium 6 containing the information tracks. In FIG. 6 the information tracks run perpendicular to the page, but they could also run parallel to the page, in the left-right direction in the drawing. The beam focused onto the information-carrying medium 6 is reflected and returns through the objective lens 5 and the quarter-wave plate 4 to the polarization beam splitter 3.

In the configuration shown in the drawing, due to the action of the quarter-wave plate 4, the light incident on the polarizaton beam splitter 3 is polarized perpendicular to the plane of the page, so it is reflected by the polarization beam splitter 3 (through an angle of 90° to the left in the drawing). The beam reflected from polarization beam splitter 3 enters the detector prism 7 and is reflected from its reflecting surface 8, then is received by the photodetector 9.

The reflecting surface 8 is set so that when the objective lens 5 is correctly focused with respect to the information-carrying medium 6, the angle between the reflecting surface 8 and the incident beam (a parallel pencil of rays in this case) is equal to or slightly less than the critical angle. If it is exactly equal to the critical angle, in the correctly focused state the entire beam reflected from the polarization beam splitter 3 undergoes total reflection at the reflecting surface 8. Since the reflecting surface 8 is necessarily imperfect, however, some light is also channeled in direction n in the drawing. If the information-carrying medium deviates from the point of focus in direction a in the drawing, the beam reflected from the polarization beam splitter 3 will include an oblique component, the maximum angle of obliquity of which is indicated by $a_{i1}$ and $a_{i2}$. If the information-carrying medium deviates from the point of focus in direction b in the drawing, the beam incident on the reflecting surface 8 will include an oblique component, the maximum angle of obliquity of which is indicated by $b_{i1}$ and $b_{i2}$. In either case, if the information-carrying medium 6 deviates from the point of focus, the beam incident on the reflecting surface 8 varies continuously around the critical angle, except for the central ray on the optic axis (the dash-dot line in the drawing). The reflectivity of the reflecting surface 8 is extremely sensitive to slight changes in the angle of incidence in the neighborhood of the critical angle, as indicated in FIG. 7. When the information-carrying medium 6 deviates in direction a or b from the point of focus, the intensity of the reflected beam will be less on one side of the plane perpendicular to the page through the center ray than on the other side in accordance with the deviation direction. By contrast, when there is no deviation from the point of focus, the intensity of the reflected beam will be the same on both sides. The photodetector 9 which detects the distribution of light reflected from the reflecting surface 8 is divided into two sections 9A and 9B at the center ray (optic axis) as shown in plane view in FIG. 6. FIG. 7 indicates the reflected intensities Rp and Rs of p-polarized light and s-polarized light when the refractive index of the detector prism 7 is 1.50. The reflected intensity of unpolarized light is intermediate between the two values, being equal to $(Rp+Rs)/2$.

If the information-carrying medium 6 is displaced in direction a in FIG. 6, of the light incident on the reflecting surface 8, that part which is located below the center ray in the drawing, extending out to the incident ray $a_{i1}$, will all be incident at less than the critical angle, so part of it will become a pencil of transmitted rays bounded by the ray n and the ray $a_{t1}$. The intensity of the bundle of reflected rays from the center ray to the outermost reflected ray $a_{r1}$ will be reduced by an amount equivalent to the transmitted rays. That part of the light incident on the reflecting surface 8 which is located above the center ray in the drawing, extending out to the incident ray $a_{i2}$, will be incident at an angle greater than the critical angle, so none of it will be transmitted; all of it will be reflected into the bundle of reflected rays from the center ray to the outermost reflected ray $a_{r2}$. As a result, section 9A of the photodetector 9 will be darkened, while section 9B will be brightened. Section 9B will not brighten if the reflecting surface 8 of the detector prism 7 is set precisely at the critical angle, for the reflection will then simply remain total as can be seen from FIG. 7, but if the reflecting surface 8 is set at slightly less then the critical angle, section 9B will brighten.

As FIG. 7 indicates, the slope of the Rp and Rs curves reaches infinity (in theory) at the critical angle, hence the sensitivity near the point of focus is greatest if the reflecting surface 8 is set at exactly the critical angle. If the reflecting surface 8 is set at less than the critical angle, sensitivity is reduced. If the reflecting surface 8 is set at more than the critical angle, there will be a dead band in which no changes in reflected intensity occur.

If the information-carrying medium 6 is displaced in direction b, the obliquity of the light incident on the reflecting surface 8 will be exactly opposite to that in the discussion above, so the darkening and brightening relationship of sections 9A and 9B of the photodetector 9 will be reversed. Let $b_{r1}$, $b_{r2}$ and $b_{t2}$ denote rays reflected and transmitted by the reflecting surface 8 in this case. When the focus is correct, equal intensities of light will strike sections 9A and 9B of the photodetector 9.

Accordingly, by detecting the difference between the outputs from sections 9A and 9B and determining the amount and polarity of the difference, it is possible to derive a signal representing the amount of deviation of the information-carrying medium 6 from the point of focus, and the direction of the deviation. The focus can then be corrected by moving the objective lens 5 parallel to its optic axis.

The structure of the focus detection apparatus of the prior art as described above gives rise to the following problems. To adjust the apparatus so that when the focus is correct the light will strike the reflecting surface 8 of the detector prism 7 at the critical angle, it is necessary to rotate the prism in the plane of the page in FIG. 6. As FIG. 7 indicates, the reflectivity characteristic changes abruptly in the vicinity of the critical angle, with a discontinuity at the critical angle, so the prism adjustment must be extremely precise. If it exceeds the critical angle even slightly, there will be a dead band in the focusing error signal. If the prism is adjusted to less than the critical angle, however, the abrupt change of the reflectivity characteristic will tend to cause variations in the initial characteristics of the focusing error signals in different manufactured units.

An example of variation that is likely to occur is the sensitivity variation of the focusing error signals in the neighborhood of the correct focus state as is mentioned earlier.

Temperature characteristics and aging changes can cause potentially larger variations in the focusing error signals from the photodetector 9, due to changes in the angle at which the beam enters the detector prism 7, resulting from slight positional displacements of the detector prism 7 or other optical components. As can be seen from the reflectivity characteristic near the critical angle in FIG. 7, if the displacement reduces the angle of incidence, the abrupt change in the reflectivity characteristic will tend to alter the characteristics of the focusing error signal, while if the displacement increases the angle of incidence, the flatness of the reflectivity characteristic above the critical angle will cause a dead band in the focusing error signal.

SUMMARY OF THE INVENTION

An object of the present invention is to solve these problems stated above.

Another object of the present invention is to provide a focus detecting apparatus capable of accurately detecting the state of focus.

According to the invention, there is provided a focus detecting apparatus comprising a light source, an optical system for guiding the beam generated by the light source, an objective lens for focusing the beam guided by the optical system onto an object, an optical member for receiving at least part of the reflected beam that has been focused onto the object by the objective lens and reflected from the object, and having a reflecting surface comprising a dielectric multilayer coating the reflectivity or transmissibility of which varies continuously with respect to the angle of incidence, and a photodetector for detecting changes in the intensity distribution of the beam from the reflecting surface in the optical member.

Because the reflective surface in this invention comprises a dielectric multilayer coating with a reflectivity that varies continuously with respect to the angle of incidence, the requirement for precise rotational adjustment of the optical member containing the reflective surface can be relaxed. Also, stable, accurate detection of the focusing state is maintained despite aging changes and other changes occurring after the adjustment.

DETAILED DESCRIPTION OF THE PREFERRED EMBODIMENTS

Figure 1:
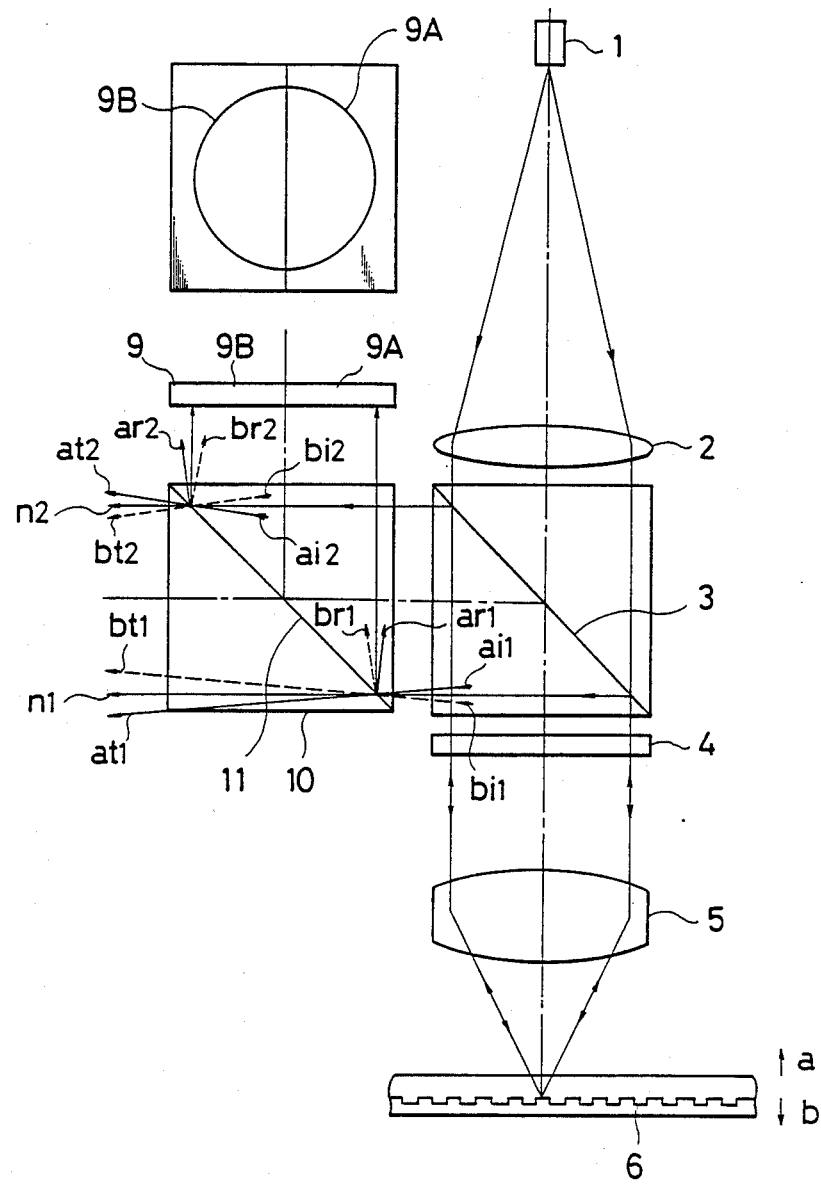
FIG. 1 is a schematic diagram of an optical recording and playback system using an embodiment of the focus detecting apparatus of this invention.

An embodiment of this invention is described below with reference to the drawings. In FIG. 1, components 1 through 6 and 9 are identical to the corresponding components in the apparatus of the prior art described previously. There is also an optical member 10 which acts as a beam splitter. A reflecting surface 11 internal to the optical member 10 is formed by a dielectric multilayer coating having a reflectivity characteristic that varies continuously with respect to the angle of incidence of the incident ray.

Figure 2:
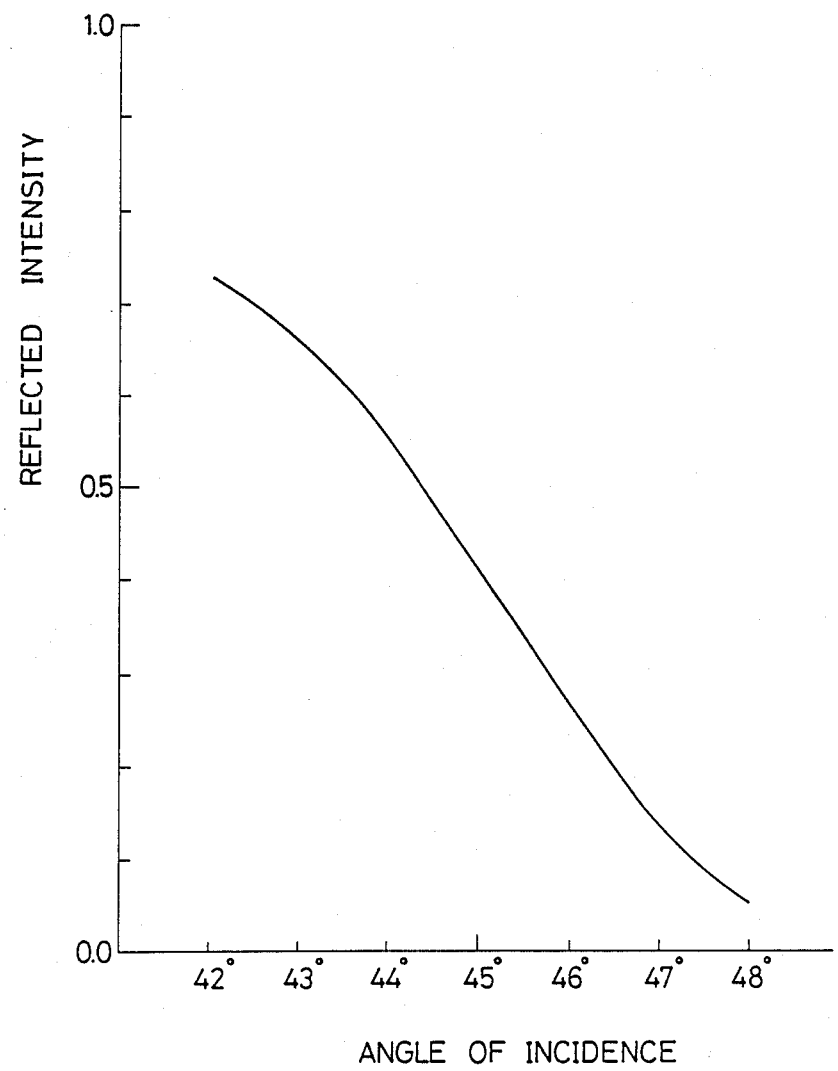
FIG. 2 shows an example of the reflectivity characteristic of the reflective surface in FIG. 1.

FIG. 2 shows an example of the reflectivity characteristic of the reflecting surface 11 with respect to the angle of incidence of the incident ray.

In a focus detecting apparatus configured as above, the beam reflected by the polarization beam splitter 3 enters the optical member 10 where it is reflected by the reflecting surface 11, and the reflected beam is received by the photodetector 9. The reflecting surface 11 is positioned so that when the objective lens 5 is correctly focused with respect to the information-carrying medium 6, the light incident on the reflecting surface 11 (a pencil of parallel rays in this case) strikes the reflecting surface 11 at an angle approximately 45°. In the embodiment under discussion the reflecting surface 11 is positioned so that the angle is exactly 45°. When the focus is correct, the entire beam reflected by the polarization beam splitter 3 to the reflecting surface 11 is parallel, so all the rays are incident on the reflecting surface 11 at the same angle of 45°, hence the reflectivity of the reflecting surface 11 is the same for all the rays. If the information-carrying medium deviates from the point of focus in direction a in the drawing, the pencil of rays reflected by the polarization beam splitter 3 includes an oblique component, the maximum obliquity of which with respect to the reflecting surface 11 is indicated by $a_{i1}$ and $a_{i2}$. If the information-carrying medium deviates from the point of focus in direction b in the drawing, the pencil of rays incident on the reflecting surface 11 includes a maximum oblique component indicated by $b_{i1}$ and $b_{i2}$ in the drawing. That is, when the information-carrying medium 6 deviates from the point of focus, the beam reflected to the reflecting surface 11, except for the center ray on the optic axis (dash-dot line), varies continuously around the angle of incidence in the correctly focused state (45° in this case). Since the reflectivity of the reflecting surface 11 varies continuously with respect to the angle of incidence as shown in FIG. 2, the intensity of the beam reflected by the reflecting surface 11 increases on one side of the plane perpendicular to the page through the center ray, and decreases symmetrically on the other side in accordance with the deviation direction. When the focus is correct, the angle of incidence on the reflecting surface 11 is uniform, so the intensity of the reflected beam is also uniform. The photodetector 9 is configured from two sections 9A and 9B separated at the position of the center ray (optic axis) as shown in plan view in FIG. 1. and detects the intensity distribution of the beam reflected from the reflecting surface 11.

A more detailed explanation is as follows. When the information-carrying medium deviates in direction a in FIG. 1, of the beam incident on the reflecting surface 11, the entire part below the center ray in the drawing, down to the outermost incident ray $a_{i1}$, has an angle of incidence less than 45°. FIG. 2 indicates that the reflectivity for this part will be higher than in the correctly focused state. The intensity of the reflected beam therefore increases in the bundle of rays extending from the center ray outward to reflected ray $a_{r1}$. The part of the beam incident on the reflecting surface 11 located above the center ray in FIG. 1, up to the outermost incident ray $a_{i2}$, has an angle of incidence greater than 45°. FIG. 2 indicates that the reflectivity for this part will be less than in the correctly focused state. The intensity of the reflected beam therefore decreases in the bundle of rays extending from the center ray outward to reflected ray $a_{r2}$.

In this case, accordingly, the intensity distribution on the photodetector 9 will change so that section 9A is brightened and section 9B is darkened.

When the information-carrying medium deviates in direction b, the obliquity of the rays incident on the reflecting surface 11 is opposite to the case just described in which the deviation is in direction a. The brightening and darkening of sections 9A and 9B of the photodetector 9 are therefore reversed. The incident and reflected rays in this case are indicated by $b_{i1}$, $b_{i2}$, $b_{r1}$ and $b_{r2}$.

In the correctly focused state, sections 9A and 9B of the photodetector 9 receive equal amounts of incident light. The rays marked $n_1$ and $n_2$ in the drawing are the rays transmitted in the correctly focused state. The rays marked $a_{t1}$, $a_{t2}$, $b_{t1}$ and $b_{t2}$ are rays that are transmitted when the information-carrying medium is displaced in directions a and b.

Accordingly, by detecting the difference between the outputs from sections 9A and 9B and determining the amount and polarity of the difference, it is possible to derive a signal representing the amount of deviation of the information-carrying medium 6 from the point of focus and the direction of the deviation. The focus can then be corrected by moving the objective lens 5 parallel to its optic axis.

A particular feature of this invention is that by employing a reflecting surface 11 consisting of a dielectric multilayer coating with a reflectivity that varies continuously with respect to the angle of incidence, as shown in FIG. 2, this invention solves the problems of the focus detection system of the prior art which made use of the critical angle. Specifically, no great precision is required in the adjustment of the optical member containing the reflecting surface 11 by rotation in the plane of the page in FIG. 1. The apparatus of the prior art demanded strict precision in the adjustment of the detector prism because of the steep slope and discontinuity of the reflectivity characteristic in the neighborhood of the critical angle, as described earlier. The reflectivity characteristic of the reflecting surface 11 used in the present invention has no points of discontinuity, and the reflectivity varies continuously with respect to the angle of incidence as indicated in FIG. 2, so rotational misadjustment of the optical member 10 will not alter the characteristics of the focusing error signal or cause a dead band. In short, the adjustment tolerance can be relaxed.

For the same reasons, the apparatus is robust with respect to temperature variations and aging changes. Positional changes in the optical member 10 or other optical components, causing changes in the angle of incidence on the optical member 10, will cause only minor changes in the focusing error signal. The dead band that occurred in the prior art is ruled out on theoretical grounds, and any changes in the characteristics of the focusing error signal will be small. The state of focus can therefore be detected in a stable, accurate manner.

A brief supplementary discussion of the principle that causes the reflectivity to vary as shown in FIG. 2 with respect to the angle of incidence is given next. For simplicity let it be assumed that the light is incident from a medium such as air or glass onto a plate of a member such as glass, and that a thin monolayer coating exists between the medium and the plate. The characteristic matrix of a thin coating, as given in Kogaku Hakumaku (Optical Thin Film), Kogaku Gijutsu Series Vol. 11, Kyoritsu Shuppan, is:

$$M = \begin{pmatrix} \cos\delta & \frac{i}{u}\sin\delta \\ iu\sin\delta & \cos\delta \end{pmatrix} = \begin{pmatrix} m_{11} & im_{12} \\ im_{21} & m_{22} \end{pmatrix} \quad (1)$$

where $$\delta = \frac{2\pi nd\cos\theta}{\lambda}, \; u = \begin{cases} n\cos\theta \ldots \text{($s$-polarized light)} \\ n\sec\theta \ldots \text{($p$-polarized light)} \end{cases}$$

n: index of refraction of the coating
d: physical thickness of the coating
θ: angle of incidence on the coating
λ: wavelength The amplitude reflectance is:

$$r = \frac{(m_{11} + im_{12}\,u_s)u_0 - (im_{21} + m_{22}\,u_s)}{(m_{11} + im_{12}\,u_s)u_0 + (im_{21} + m_{22}\,u_s)} \quad (2)$$

The energy reflectance, or reflected intensity, is:

$$R = |r|^2 \quad (3)$$

In the above equations, $$u_o = \begin{cases} n_o \cos\theta_o & \text{($s$-polarized light)} \\ n_o \sec\theta_o & \text{($p$-polarized light)} \end{cases}$$

$$u_s = \begin{cases} n_s \cos\theta_s & \text{($s$-polarized light)} \\ n_s \sec\theta_s & \text{($p$-polarized light)} \end{cases}$$

$\theta_o$: angle of incidence onto the coating
$\theta_s$: angle of refraction from the coating to the plate
$n_o$: index of refraction on entrance side (index of refraction of the medium)
$n_s$: index of refraction on exit side (index of refraction of the plate)

Equations (1) to (3) indicate that the reflected intensity varies depending on the angle of incidence.

For a multilayer coating, the characteristic matrix Mm is the product of the characteristic matrices Mj of the monolayers:

$$Mm = \prod_{j=1}^{k} Mj$$

The reflectivity can again be calculated from equations (2) and (3).

It is therefore possible to create a multilayer coating having a reflectivity characteristic like that shown, for instance, in FIG. 2.

Recently computer programs for analyzing such multilayer coatings have become generally available, so the analytical calculations can be performed more easily than in the past.

Figure 8:
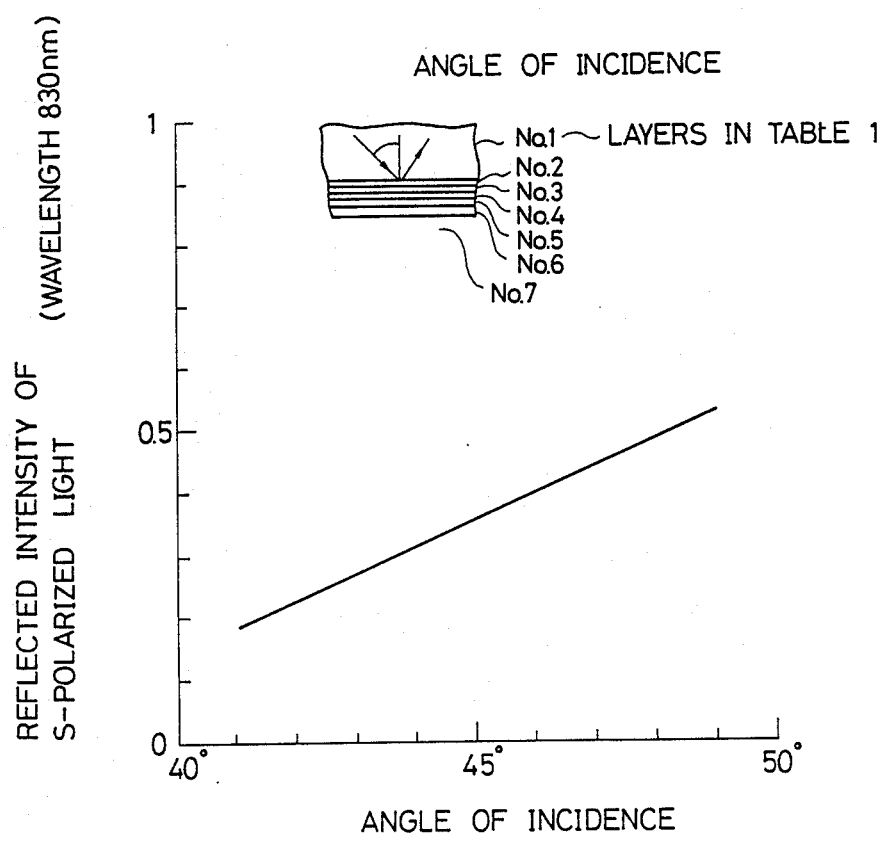
FIG. 8 shows an example of the reflectivity of a dielectric multilayer coating for s-polarized light.

FIG. 8 shows a computation of the dependency of the reflectivity on the angle of incidence for s-polarized light, as calculated by a commercially available program. The parameters of the layers are given in Table 1.

By properly choosing the layer configuration, it is possible to generate a characteristic like that in FIG. 2, or one in which the reflected intensity varies more in which the reflected intensity varies linearly with respect to the angle of incidence.

TABLE 1

| | Layer Configuration | | |
|---|---|---|---|
| Layer* | Index of refraction (Real) | Index of refraction (Image) | Thickness (nm) |
| 1 | 1.52 | 0.0 | (Glass equivalent) |
| 2 | 2.30 | 0.0 | 128.82 |
| 3 | 1.38 | 0.0 | 214.70 |
| 4 | 2.30 | 0.0 | 128.82 |
| 5 | 1.38 | 0.0 | 214.70 |
| 6 | 2.10 | 0.0 | 141.09 |
| 7 | 1.00 | 0.0 | (Air equivalent) |

*Numbered 1, 2, ... from the incident side

Figure 3:
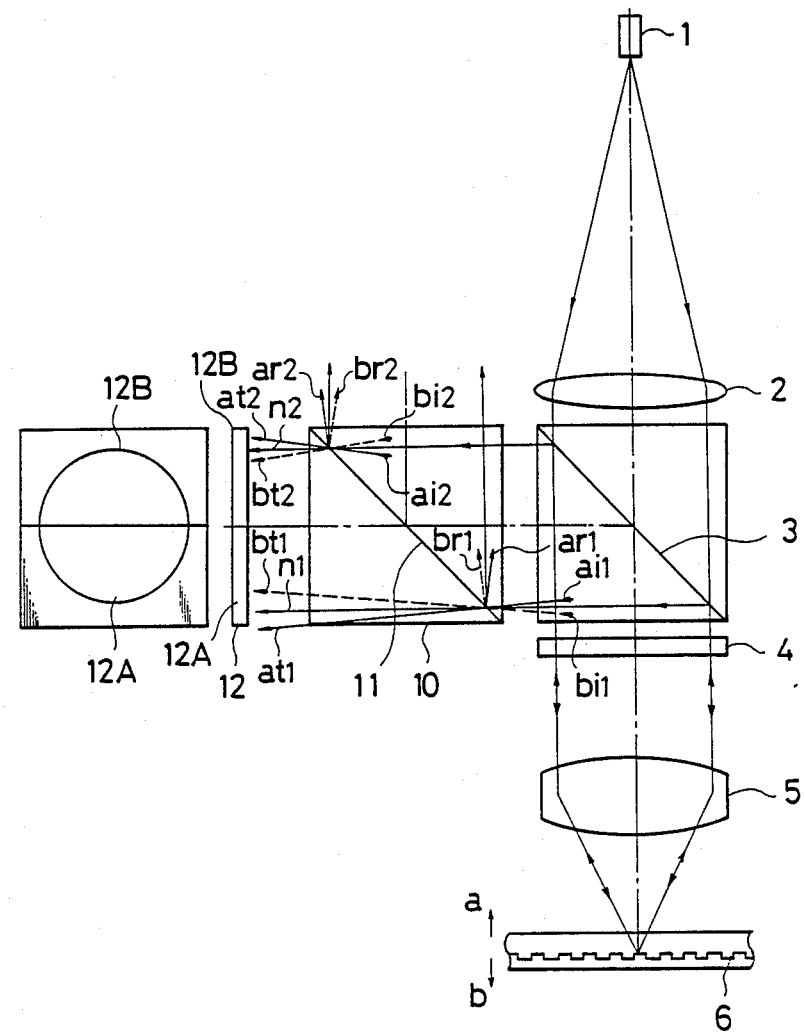
FIG. 3 is a schematic diagram of an optical recording and playback system using another embodiment of the focus detecting apparatus of this invention.

FIG. 3 shows another embodiment of the present invention. This embodiment includes a photodetector 12 comprising sections 12A and 12B as shown in plan view in FIG. 3. The photodetector 12 detects changes in the intensity distribution of the light transmitted by the optical member 10. Otherwise, this embodiment is identical in structure to that in FIG. 1. In FIG. 1 the light reflected by the reflecting surface 11 of the optical member 10 was used, but the reflectivity and transmissibility of the reflecting surface 11 are closely related: if there is no absorption, for example, then reflectivity + transmissibity = 1.

Detecting variations in the intensity distribution of the transmitted light as in FIG. 3 therefore provides an effect similar to that in FIG. 1.

Figure 6:
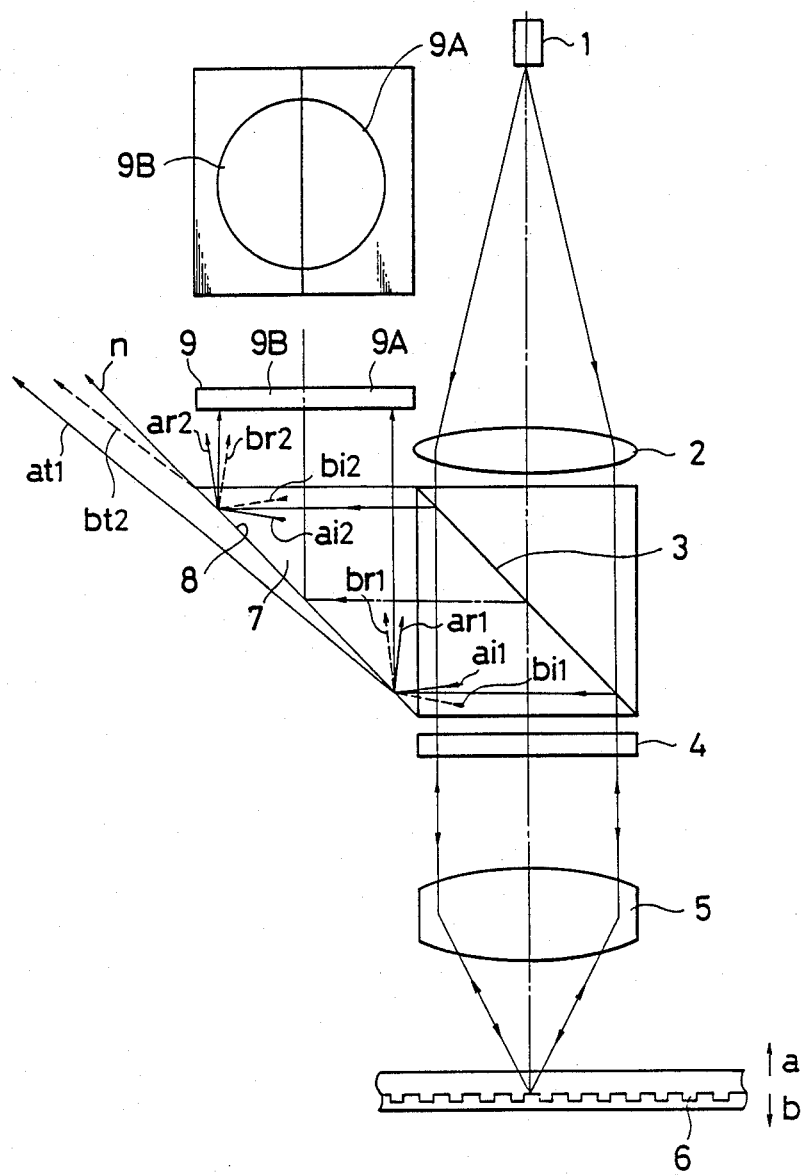
FIG. 6 is a schematic diagram of an optical recording and playback system using the focus detecting apparatus of the prior art.
Figure 7:
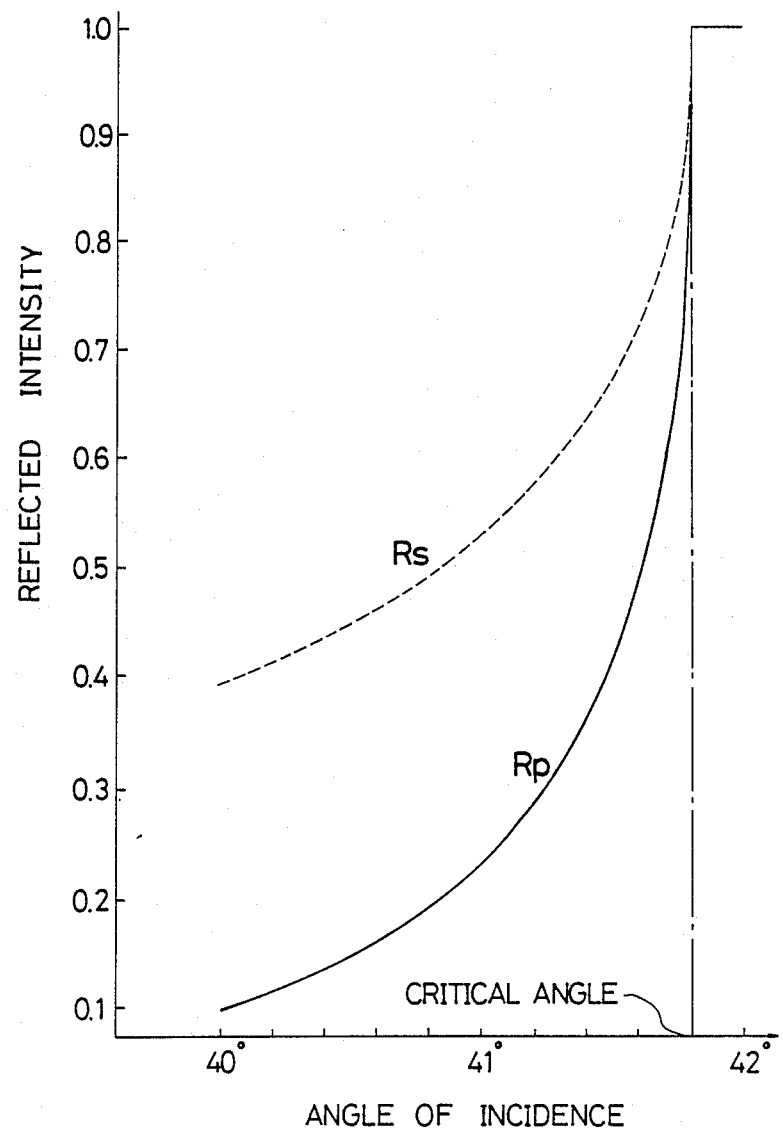
FIG. 7 shows an example of the reflectivity in the neighborhood of the critical angle of the reflective surface in FIG. 6.

Incidentally, it is possible to produce a focusing error signal in the prior art apparatus shown in FIG. 6 by locating the photodetector 9 at a position where the light transmitted through the surface 8 is incident on the photodetector 9. In this case, however, there occur such problems as stated above in the case using the light reflected by the surface 8. Furthermore, there occurs such an additional problem as stated below. Namely, since the surface 8 is located so that the incident angle of the light is in the vicinity of the critical angle, the light transmitted through the surface 8 is directed in the direction almost along the surface 8. Therefore the diameter of the transmitted light is very small and it is difficult to adjust the position of the photodetector 9 so that the transmitted light is incident precisely on the photodetector 9. In other words, in the apparatus of prior art, it can be said that it is advantageous to use the reflected light rather than the transmitted light.

In the invention, however, the embodiment using the transmitted light as shown in FIG. 3 has no such an additional problem and therefore it can not be said that the embodiment shown in FIG. 3 is disadvantageous compared with the embodiment using the reflected light as shown in FIG. 1.

Figure 4:
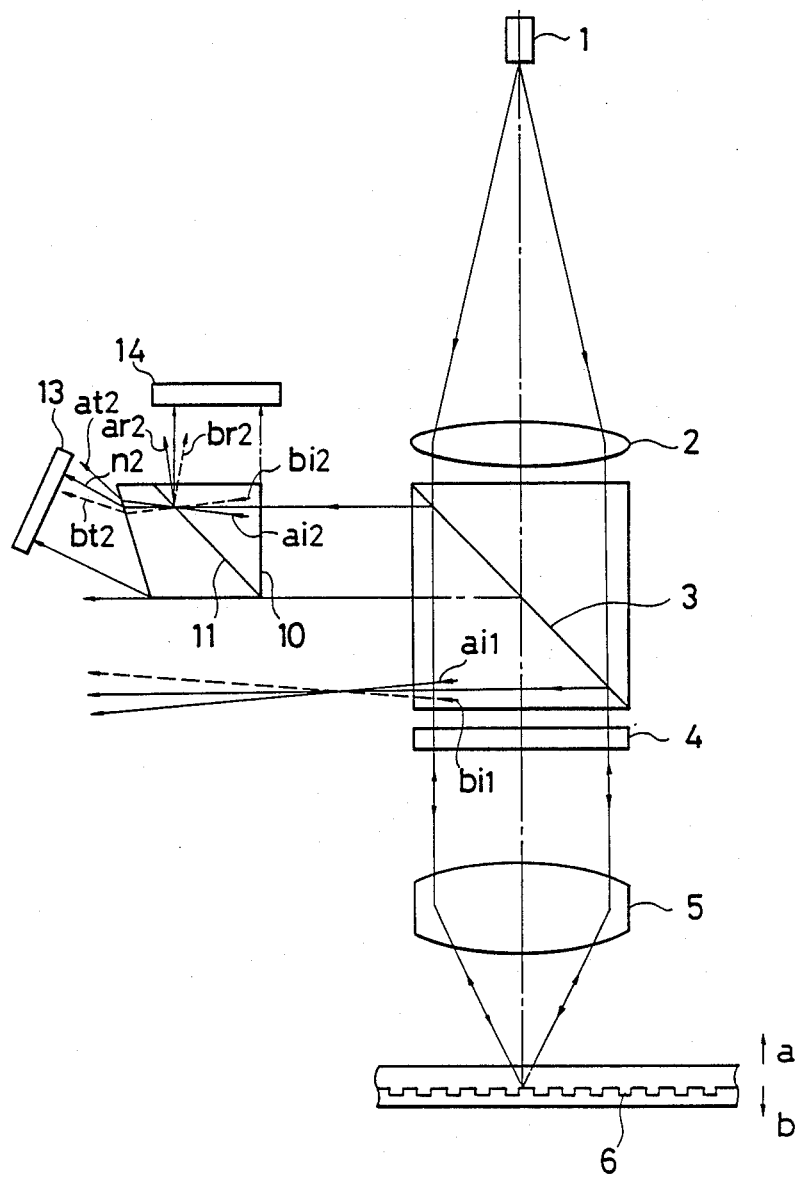
FIG. 4 is a schematic diagram of an optical recording and playback system using a third embodiment of the focus detecting apparatus of this invention.
Figure 5:
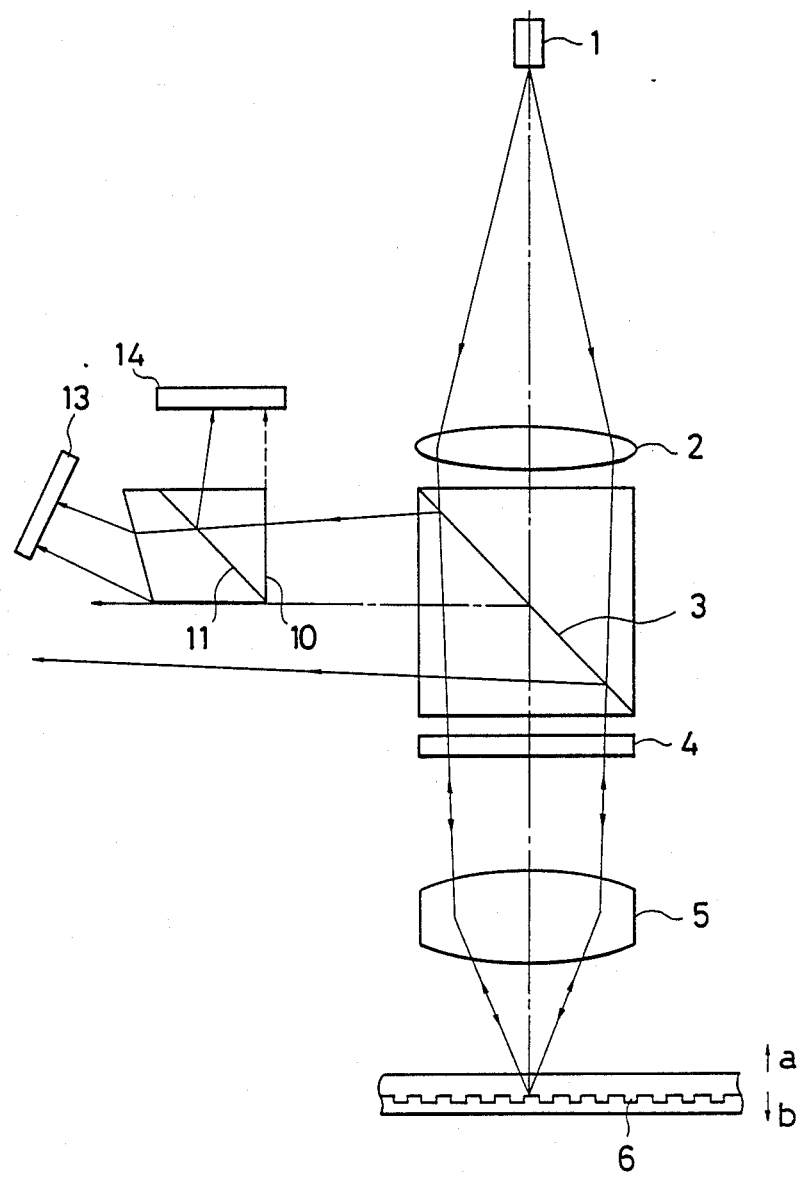
FIG. 5 is a schematic diagram of an optical recording and playback system using a fourth embodiment of the focus detecting apparatus of this invention.

Other embodiments of this invention are possible in which only part of the beam reflected from the polarization beam splitter is used and the reflected beam is made to diverge or converge. These embodiments will explained with reference to FIG. 4 and FIG. 5. FIG. 4 shows an embodiment wherein part of the beam from the polarization beam splitter 3 is directed into an optical member 10 configured so that when the focus is correct, the reflecting surface 11 reflects and transmits light in a fixed proportion. The transmitted and reflected beams are received by photodetectors 13 and 14. The rest of the apparatus in FIG. 4 is the same as in FIG. 1. If movement of the information-carrying medium 6 in direction a or b causes deviation from the point of focus, there will be a corresponding difference in the outputs from the photodetectors 13 and 14, and a focusing error signal can be obtained from the amount and polarity of this difference as in FIG. 1. The remaining part of the beam, which is not directed into the optical member 10, can be used for another purpose. In this embodiment it is only necessary for the intensities received by the photodetectors 13 and 14 in the correctly focused state to be in the correct proportion; it is not necessary for the pencil of rays reflected from the information-carrying medium 6 to be parallel when the focus is correct. The rays can be convergent, as shown in FIG. 5, or they can be divergent.

In all these alternative embodiments, the reflecting surface 11 is a dielectric multilayer coating having a reflectivity characteristic that varies continuously with respect to the angle of incidence, like the characteristic in FIG. 2.

As in the embodiment in FIG. 1, this has the effect that less precision is required in the rotational adjustment of the optical member 10 containing the reflecting surface 11, and there is a wider tolerance for positional deviations caused by temperature variations or aging changes. The result is to provide stable, accurate detection of the focusing state.

In an optical system for reading video discs in which the information tracks have a spiral or concentric circle configuration on the information-carrying medium as in the preceding embodiments (FIG. 1 for example), if the information-carrying medium is configured so that the information tracks extend parallel to the plane of the page (the left-right direction in FIG. 1), in other words, sections 9A and 9B extend in the direction parallel to the tracks, the change in the intensity distribution when the beam moves across a track (namely, tracking error signal components) will not affect the focusing error signal.

This invention is not limited to the embodiments herein described. In FIG. 1, for example, the beam directed onto the optical member 10 is s-polarized, but it is also possible to set a half-wave plate between the polarization beam splitter 3 and the optical member 10, or rotate the positional relationship of the polarization beam splitter 3 and the optical member 10 by 90 so that it is perpendicular to the page, in which case the incident light will be p-polarized.

This invention can be applied to detect focus not only in optical recording and playback systems for video discs but also in optical recordings and playback systems for compact discs, optical memory discs and optical memory cards and in other optical systems.

What is claimed is:

1. A focus detecting apparatus comprising
   a light source,
   an optical system for guiding the beam generated by the light source,
   an objective lens for focusing the beam guided by the optical system onto an object,
   an optical member for receiving at least part of the reflected beam that has been focused onto the object by the objective lens and reflected from the object, and having a reflecting surface comprising a dielectric multilayer coating the reflectivity or transmissibity of which varies continuously with respect to the angle of incidence, and
   a photodetector for detecting changes in the intensity distribution of the beam reflected by or transmitted through the reflecting surface in the optical member.

2. A focus detecting apparatus as set forth in claim 1, wherein the beam reflected from the object and entering the optical member is p-polarized or s-polarized with respect to the reflecting surface.

3. A focus detecting apparatus as set forth in claim 1, wherein the apparatus is configured so that when the objective lens is correctly focused with respect to the object, the reflected beam comprises a pencil of parallel rays.

4. A focus detecting apparatus as set forth in claim 1, wherein the apparatus is configured so that when the objective lens is correctly focused with respect to the object, the reflected beam comprises diverging or converging rays.

5. A focus detecting apparatus as set forth in claim 1, wherein the photodetector substaintially comprises two sections extending in the direction parallel to information tracks on the object.

6. A focus detecting apparatus as set forth in claim 1, wherein the optical system comprises a polarization beam splitter directing part of the reflected beam to the optical member.

* * * * *